US009069824B2

(12) United States Patent
Pompey et al.

(10) Patent No.: US 9,069,824 B2
(45) Date of Patent: *Jun. 30, 2015

(54) ACCELERATING TIME SERIES DATA BASE QUERIES USING DICTIONARY BASED REPRESENTATIONS

(71) Applicant: INTERNATIONAL BUSINESS MACHINES CORPORATION, Armonk, NY (US)

(72) Inventors: Pascal Pompey, Mulhuddart (IE); Olivier Verscheure, Mulhuddart (IE); Michael Wurst, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/678,024

(22) Filed: Nov. 15, 2012

(65) Prior Publication Data

US 2014/0136563 A1 May 15, 2014

(51) Int. Cl.
*G06F 7/00* (2006.01)
*G06F 17/00* (2006.01)
*G06F 17/30* (2006.01)

(52) U.S. Cl.
CPC ............................... *G06F 17/30551* (2013.01)

(58) Field of Classification Search
USPC .................................. 707/687, 694, 721, 722
See application file for complete search history.

(56) References Cited

U.S. PATENT DOCUMENTS

| | | | |
|---|---|---|---|
| 6,496,817 B1 | 12/2002 | Whang et al. | |
| 6,834,266 B2 | 12/2004 | Kumar et al. | |
| 6,993,516 B2 | 1/2006 | Haas et al. | |
| 7,400,274 B2 * | 7/2008 | Fallon et al. | .................... 341/51 |
| 7,716,011 B2 | 5/2010 | Thibaux et al. | |
| 7,877,233 B2 | 1/2011 | Middleton, Jr. et al. | |
| 8,121,429 B2 * | 2/2012 | Kondo et al. | ................. 382/254 |
| 2009/0063603 A1 | 3/2009 | Droz et al. | |
| 2010/0325132 A1 | 12/2010 | Liu et al. | |
| 2011/0060753 A1 | 3/2011 | Shaked et al. | |
| 2011/0283099 A1 | 11/2011 | Nath et al. | |
| 2011/0307472 A1 | 12/2011 | Slezak et al. | |
| 2012/0330931 A1 * | 12/2012 | Nakano et al. | ................ 707/722 |

OTHER PUBLICATIONS

Malecha et al.; "Toward a Verified Relational Database Mangement System", ACM POPL'10 Madrid, Spain, 17-13 Jan. 2009, pp. 1-12.
IP.Com et al.; "A Data Preprocessing Pipeline to Improve . . . of a Relational database Management System's Classification Algorithm", IPCOM000211370D, Sep. 29, 2011.
Willis Lang, et al., "Dictionary-Based Compression for Long Time-Series Similarity," IEEE Transaction on Knowledge and Data Engineering, Vol. 22, No. 11, Nov. 2010.

* cited by examiner

*Primary Examiner* — Tony Mahmoudi
*Assistant Examiner* — Muluemebet Gurmu
(74) *Attorney, Agent, or Firm* — F. Chau & Associates, LLC

(57) ABSTRACT

A method for accelerating time series data base queries includes segmenting an original time series of signal values into non-overlapping chunks, where a time-scale for each of the chunks is much less than the time scale of the entire time series, representing time series signal values in each chunk as a weighted superposition of atoms that are members of a shape dictionary to create a compressed time series, storing the original time series and the compressed time series into a database, determining whether a query is answerable using the compressed time series or the original time series, and whether answering the query using the compressed time series is faster. If answering the query is faster using the compressed representation, the query is executed on weight coefficients of the compressed time series to produce a query result, and the query result is translated back into an uncompressed representation.

17 Claims, 3 Drawing Sheets

ACCELERATING TIME SERIES DATA BASE QUERIES USING DICTIONARY BASED REPRESENTATIONS

BACKGROUND

1. Technical Field

This disclosure is directed to methods for accessing relational data bases containing time series data.

2. Discussion of Related Art

Efficiently storing and querying time-series data in relational data bases is challenging. On the one hand, the relational data model does not directly support a notion of order, but does so only indirectly through timestamps. This makes operations such as interpolation very complex. On the other hand, time-series data sets, especially if derived from sensor data, can be extremely large. This is primarily due to the fact that time-series data are stored as pairs of time stamp and value. As a consequence, queries can be expensive due to high I/O costs. One way to reduce I/O cost is to store data into the database in a compressed form to reduce I/O and computational cost. However, this approach is challenging, as different data and queries might require different compression. In addition, decompression can significantly slow query response time. Finally, compression must ensure that existing DBMS optimizations are fully exploited or otherwise the benefits over non-compressed storage might not be effective.

More specifically, a compressed representation should satisfy the following requirements:

1. It should be well-suited for time and value-series, taking the implicit ordering of values into account to allow for appropriate compression.
2. Alternative representations should be possible, so that for any given query, the best representation can be chosen before executing the query
3. It should be possible to answer queries directly on the compressed representation, as otherwise decompression would become the bottleneck, potentially negating the advantage of reducing I/O through compression. In addition, needing to decompress the data implies there is sufficient memory to hold the actual non-compressed data. In most computer systems however, maim memory is the main bottleneck driving the I/O need and most of the computation time.
4. It should make full use of the security, optimization and parallelization features of the underlying data-base, as these facilities have been extensively optimized and re-inventing them would be prohibitively expensive.

While there are general methods to compress data in databases, as well as methods to compress values series outside databases, none of these methods fulfills all of the above requirements.

Two current techniques for general data compression in databases are row compression and vertical/key-value databases.

Row-based compression utilizes patterns in the values of individual records that can be used to compress the content of a row using techniques such as the Lempel-Ziv-Welch (LZW) algorithm. These techniques are not applicable to time-series, as time series, by nature, only contain a time-stamp and a single value in a row. However, compressible information in time-series spans several rows, not just a single one.

Vertical or key-value databases are well-suited if different records use different columns. In this case, the relational model would be ill-suited, as it assumes a fixed scheme of columns over all records. Therefore, storing such data in a relational model would imply a large number of missing values to force all records to the same scheme. This method is of limited use for time-series data, as all records usually share the same number of values.

One way to reduce the cost of storing time-series in databases is to eliminate the need for a time-stamp for each value by storing values in an array, such that each time-series is encoded in a single row in the underlying database system, such as employed by Informix. However, many of the indexing and optimization capabilities of the database can not be exploited. In particular, all queries along the time axis are bound to be very slow. Another drawback of these generic methods is that they usually need to decode or decompress the data before applying the query.

There is some work on compressing time and value series, mostly based on wavelet or Fourier transformations. In practice, most time series signals do not compressible well using the Fourier transformation; for example, the metered data coming from electricity, water or transportation metering systems typically has a low frequency sampling and have shapes that are very different from sine or cosine curves. They therefore do not compress well using a Fourier based compression.

Another way to compress temporal data is not to store the actual values but only the changes over time. If large portions of the data are constant, this can lead to a significant compression. However, it is hard to apply queries directly to the compressed data, making it necessary to decompress the data first.

Another structural issue of the above mentioned compression techniques is that the compression/accuracy trade-off should be fixed once and then used throughout the application. Usually, the higher the compression, the lesser is the reconstruction accuracy. Depending on the use of the queries, different accuracy/compression trade-offs may be required:

for exploratory queries that need to quickly obtain a rough estimate of the queries result, a low accuracy high compression that leads to a shorter query response would be appropriate; and on the other hand, queries requiring an exact estimate for business critical applications might prefer to target a high accuracy, therefore selecting a low compression with a high query answering latency.

Usually businesses need to answer both kinds of questions on the same data, making compression techniques that enable dynamically choosing the right compression/accuracy trade-off very valuable.

A recently proposed set of techniques for compressing signal is dictionary based compression. Dictionary compression has been extensively used for image and video compression. However, it is not obvious how to implement this technique for representing and processing time series into a relational database.

BRIEF SUMMARY

According to an aspect of the invention, there is provided a method for accelerating time series data base queries, including segmenting an original time series of signal values into non-overlapping chunks, where a time-scale for each of the chunks is much less than the time scale of the entire time series, representing time series signal values in each chunk as a weighted superposition of atoms that are members of a shape dictionary, to create a compressed time series, storing the original time series and the compressed time series into a database, determining whether a query is answerable using the compressed time series or the original time series, and whether answering the query using the compressed time series is faster, and if answering the query is faster using the compressed representation, executing the query on weight coefficients of the compressed time series to produce a query result, and translating the query result back into an uncompressed representation.

According to a further aspect of the invention, wherein determining whether answering the query using the compressed time series is faster comprises calculating a ratio of a number of affected chunks in the compressed time series over a number of affected signal values of the original time series, where a speedup of query execution is proportional to the ratio.

According to a further aspect of the invention, the method includes executing the translated query on a higher different compression level to obtain an approximate result more quickly.

According to a further aspect of the invention, the higher different compression level is determined by the number of elements of the shape dictionary that are used in the compressed representation.

According to a further aspect of the invention, the method includes storing in compressed form additional time-series derived from the original time-series to speed up a specific query.

According to a further aspect of the invention, a shape dictionary used to compress the derived time series is different from the shape dictionary used to compress the original time series.

According to a further aspect of the invention, the method includes representing squares of time series signal values in each chunk as a weighted superposition of atoms that are members of a squared shape dictionary, to create a compressed squared time series, wherein a variance of the original time series is calculated from the compressed time series and the compressed squared time series.

According to a further aspect of the invention, the method includes, for a query involving an inner product of two time series, summing a product of weight coefficients respectively associated with a compressed version of each time series.

According to a further aspect of the invention, the original time series is $S=(s(t_1), \ldots, s(t_n))$ with n values, the shape dictionary is $D=\{\phi_i, i \in I\}$ with each atom $\phi_i=(\phi_i(t_1), \ldots, \phi_i(t_n))$ of the dictionary being a set of signal samples, and the weighted superposition of atoms is $$S(t) = \sum_{i=1}^{k} \alpha_i \varphi_i(t),$$

wherein the $\alpha_i$ are weight coefficients determined to fit the signal samples to the time series.

According to a further aspect of the invention, if the query is answerable using the compressed time series and answering the query using the compressed time series is faster, the method includes translating the query to use the compressed time series, identifying all chunks in the compressed time series that have a time overlap with the query, executing the translated query on the overlapping compressed time series chunks to obtain compressed query results, aggregating the compressed query results, and translating the aggregated query result back into an uncompressed representation by summing over elements of the shape dictionary.

DETAILED DESCRIPTION

Figure 1:
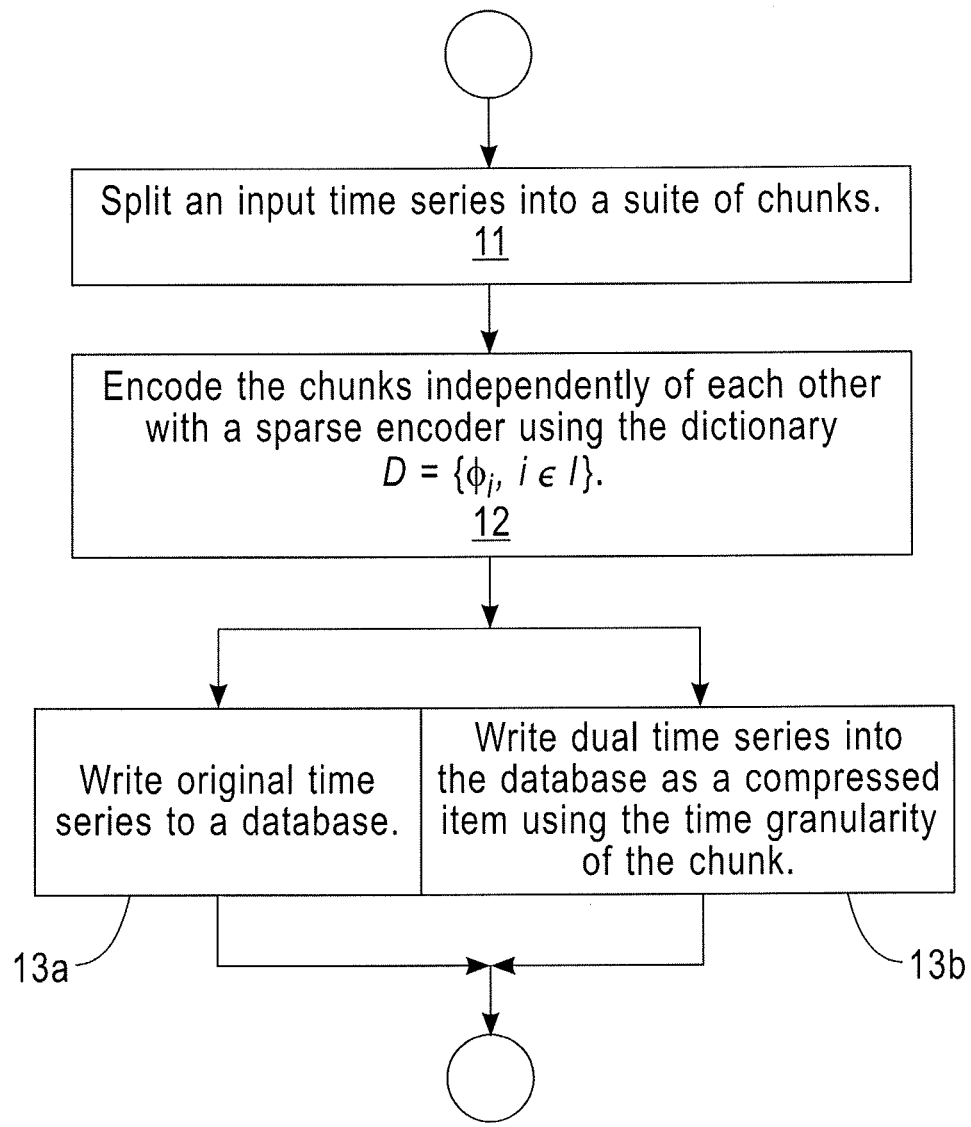
FIG. 1 is a flowchart of a method for encoding and inserting data items into a database, according to an embodiment of the invention.

Exemplary embodiments of the invention as described herein generally include systems and methods for a dual representation of time-series in relational data-bases and for automatically determining which representation to use for answering a given query. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Embodiments of the present disclosure use a dual representation method that maps the dictionary model to relational databases that can achieve appropriate compression, can execute most of the usual business and data exploration queries directly on the compressed data, and can use all existing security and optimization features of the underlying DBMS.

A method according to embodiments of the present disclosure uses a dual representation for time-series data in relational data-bases, referred to herein below as a raw and a dual representation, respectively, and automatically decides which representation (raw or dual) to use for answering a given query. Both representations make full use of all features of the underlying data-base system concerning parallelism, distribution, security, etc. The first, raw, representation is well-known and stores time-series as pairs of time-stamp and value. The second, dual representation uses a dictionary to compress the series. While dictionary based representations have been extensively used by the signal processing community to encode images and videos, embodiments show how to apply dictionary based representations to time series data and how to efficiently implement it in a relational database using standard data types and operations. Some key queries can be answered directly on the compressed representation of the signal, therefore leading to speed ups. Embodiments also use a method that can trade accuracy for response time, by using the most important part of the compressed signal for computation. In this way, a rough approximation of a query response can be quickly returned to the user, while a more accurate version is calculated in the background on the full data set.

Using a dual representation according to embodiments of the present disclosure, many queries, e.g. aggregates such as sum and average, can be answered faster, especially on massive amounts of data, for which I/O cost is a bottleneck. By allowing for approximate results, the user can quickly obtain a preview of the actual result, which facilitates interactive work. In addition, by providing a mapping to the relational model, methods according to embodiments can be implemented into any SQL based DBMS without modifications to their internal structure and code base.

A dictionary is not constrained to a family of function shapes but can be constituted with any shape. Thus, the shapes can take any form. However, this does not mean that the dictionaries are initialized with arbitrary random shapes.

Choosing an efficient dictionary of shapes for efficiently compressing a type of signal is the topic of a whole body of research known as "Dictionary learning". Dictionary learning can determine a set of good "unconstrainted" shapes that enable an efficient compression of signals of the type given as input.

Dictionary-based signal compression may be summarized as follows. Let $S=(s(t_1), \ldots, s(t_n))$ be a signal with n values, and $D=\{\phi_i, i \in I\}$ be a dictionary of shapes with each element $\phi_i=(\phi_i(t_1), \ldots, \phi_i(t_n))$ of the dictionary being signal samples. A dictionary-based compression represents S as follows:

$$S = \sum_{i=1}^{k} \alpha_i \varphi_i(t_i) \quad (1)$$

Using that representation, S can be fully determined through the $\alpha_i$ coefficients, so that if few of these coefficients are non-zero, then the representation $S=(\alpha_1, \ldots, \alpha_k)$ is much smaller than $S=(s(t_1), \ldots, s(t_n))$.

Sparse compression theory provides efficient methods for extracting a suitable dictionary D and selecting the $\alpha_i$, coefficients to ensure that the encoding of S over the dictionary D is faithful and enables a high compression.

To use dictionary-based compression, the size n of the handled signals should remain constant. Therefore, embodiments segment a time-series into non-overlapping chunks of the original signal of size n and use then dictionary encoding on each chunk for compressing the overall time series. Embodiment chose the chunk size to be one day because many time-series representing human behaviors, such as energy consumption, water consumption or road traffic, have clear daily patterns that enable achieving high compressions using dictionaries. However, it is to be understood that day size chunks are exemplary and non-limiting, and other chunk sizes can be chosen in other embodiments.

Dictionary compression has several features that can be exploited for representing and querying time series:
 Good compression over a wide variety of signals;
 Linearity, which can be used to execute queries directly on the compressed data; and
 Exponential decay, which allows quickly obtaining approximate results and then progressively making them more accurate.

Embodiments of the present disclosure use a dual representation model to store time series data. A first representation is the standard representation of times series as shown in Table 1:

| Int TSID | Timestamp TS | Float value |
|---|---|---|
| 1 | 2001/01/02 00:00:00 GMT | 0.5 |
| 2 | 2002/04/02 06:05:10 GMT | 3.6 | where TS is a time stamp and TSID is a time stamp ID. A second representation is new and utilizes dictionary compression. Embodiments of the present disclosure provide a method for efficiently representing a time-series in a relational data base using dictionary based compression by storing each chunk as the start of the chunk and the coefficients representing the compressed version of the time-series values of that chunk $S=(\alpha_1, \ldots, \alpha_k)$. FIG. 1 is a flowchart of a method according to an embodiment of the present disclosure for encoding and inserting data items into a database. Referring now to the figure, a method begins at step 11 by splitting an input time series $TS(t)=(ts(t_1), ts(t_2), \ldots, ts(t_N))$ into a suite of chunks $TS(t)=(S_0, \ldots, S_K)$, typically by days, with $S_k=(ts(t_{k,n}), \ldots, ts(t_{k,n+1}))$. A sparse encoder encodes the chunks independently of each other at step 12 using the dictionary D: $S_k(t) \approx \Sigma_i^{sp} \alpha_{k,i} \phi_i(t)$ to create the dual time series, where $D=\{\phi_i, i \in I\}$, and sp is a number of dictionary entries needed to accurately reproduce the original time series. The original time series is written to the database at step 13a, and the dual time series is stored into the database at step 13b as a compressed item using the time granularity of the chunk.

Using this dictionary based representation, the relational representation of a time-series in a data base becomes as shown in Table 2:

| Int TSID | Date TS | Short ALPH_ID | Float ALPH_VAL | Short EN_INDEX |
|---|---|---|---|---|
| 1 | 2001/01/01 | 4 | 21 | 1 |
| 2 | 2002/04/02 | 2 | 17 | 3 | where ALPH_ID is the index j of the dictionary element used in $S(t) \approx \Sigma_i \alpha_{i,j} \phi_j(t)$, ALPH_VAL is the value $\alpha_{i,j}$, and EN_INDEX is the index i indicating the rank of this dictionary element in $S(t) \approx \Sigma_i \alpha_{i,j} \phi_j(t)$. If EN_INDEX=1, then the rank is high and the importance of this element in the signal's decomposition is high; if EN_INDEX is large, the importance of this dictionary element is small and might be neglected to speed up calculations. In summary, if a signal S(t) is represented through a dictionary compression of the form $S(t) \approx \Sigma_i \alpha_{i,j} \phi_j(t)$, each row of table 2 contains all the information to fully define one element $\alpha_{i,j} \phi_j(t)$ of the sum involved in the signal's decomposition. Table 1 represents the signal $S=(s(t_1), \ldots, s(t_n))$ as a suite of points linked with time stamps, Table 2 represents the signal $S(t)=(d(day_1), d(day_2), \ldots, d(day_k))$ as a suite of daily dictionary decompositions of the same signal, with $d(day_j)$ being of the form $S(t) \approx \Sigma_i \alpha_{i,j} \phi_j(t)$.

A dual representation $S=(\alpha_1, \ldots, \alpha_k)$ according to embodiments uses fewer coefficients than the primary $S=(s(t_1), \ldots, s(t_n))$ representation, meaning that k is much smaller than n so that the number of points n needed to represent one day in the Table 1 representation is larger than the number of points k needed to represent the same day in Table 2. Therefore, Table 2 is usually much smaller than Table 1 for the same information content. Depending on the kind of time-series processed, a time series represented in a Table 2 format according to embodiments are from about 3 to 500 times smaller than if stored using the usual Table 1 format. These compression factors enable reducing the storage and I/O cost of a time-series.

Embodiments of the disclosure provide a method for mapping aggregation and correlation queries so that they can be answered directly on a dictionary based representation according to embodiments without decompressing the data. As stated above, answering queries directly on the compressed version of the data can reduce the memory cost needed to cache the data, and the size of the data that need to be processed for answering the queries. This leads to a speed up in answering the user's queries that is at least as big as the compression factor achieved for the storage. While not all queries can be answered directly on the compressed representation of the time-series, aggregation and correlation queries cover most of the business critical queries targeting time-series data.

The linearity of the compression formula enables directly answering queries in the compressed representation. This linearity enables first computing almost any linear query directly on the compressed coefficients and then applying the sum that decompresses the data on the result of that query. The following shows how this principle can be applied to answer aggregation queries.

Suppose there is a set of signals Set=$\{s_1, \ldots, s_J\}$ from which the sum should be computed. The signals can be any set of chunks of one or many time-series and the signal are stored using their compressed form:

$$s_j(t) \approx \Sigma_i^{sp} \alpha_{j,i} \phi_i(t),$$

$$S(t) = \Sigma_j s_j(t), \quad (2)$$

where sp is a number of samples per chunk. Then there is $$S(t) \approx \sum_j^k \sum_i^{sp} \alpha_{j,i} \varphi_i(t) \quad (3)$$

$$S(t) \approx \sum_i^{sp} \left( \sum_j^k \alpha_{j,i} \right) \varphi_i(t)$$

The sum over the signal values can be translated into a sum on the $\alpha_i$ coefficients which can be directly computed on the compressed representation of the signal without the need of any decompression. The result of this sum on the $\alpha_i$ coefficients is then translated back into an uncompressed result using a simple sum over the elements of the dictionary.

Figure 2:
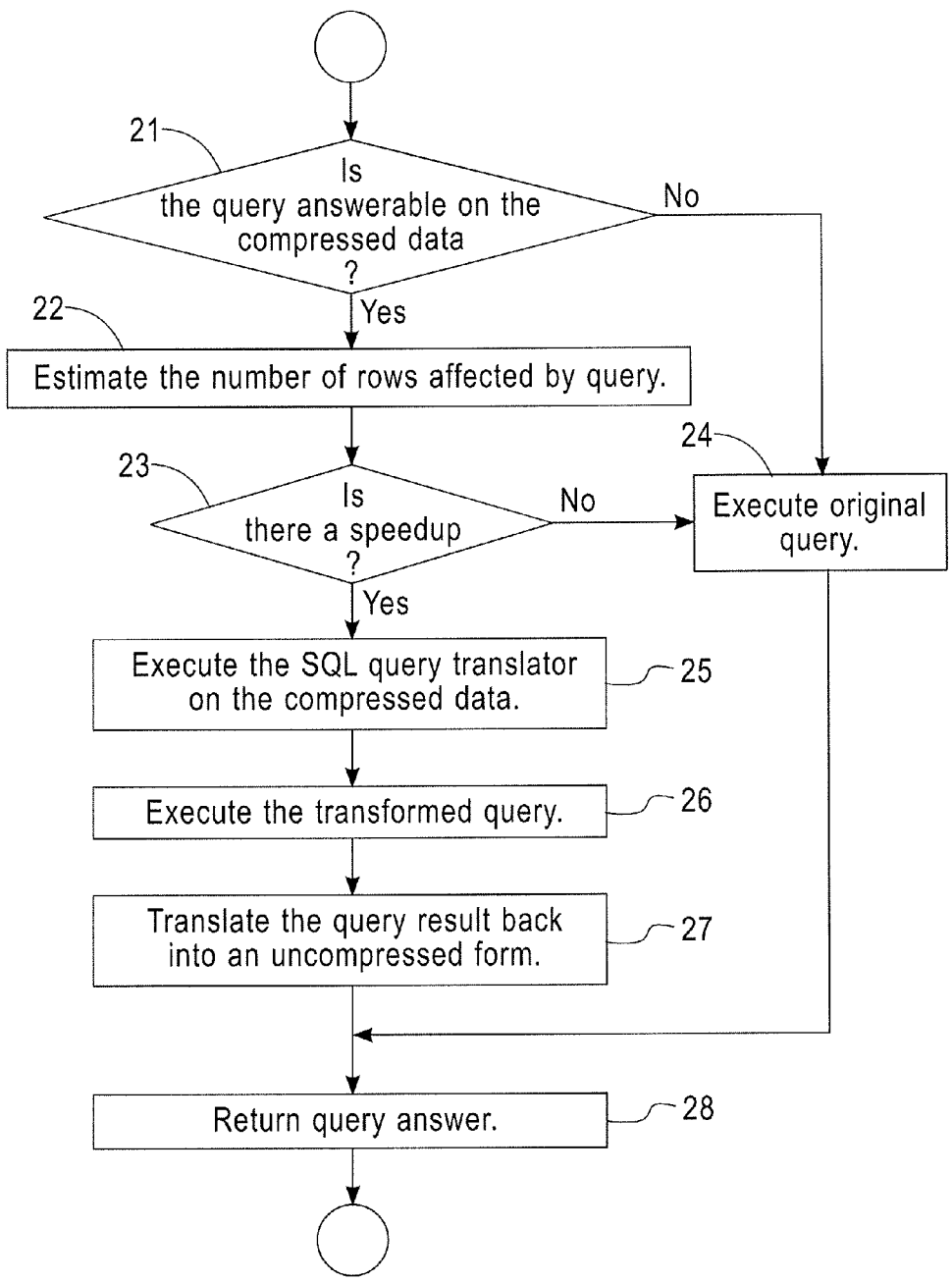
FIG. 2 is a flowchart of answering a query, according to an embodiment of the invention.

FIG. 2 is a flowchart of a method of answering a query, according to an embodiment of the invention. Referring now to the figure, given a query, a method begins at step 21 by determining whether the query is answerable on the compressed data. If the answer to step 21 is 'no', the query is executed on the original data items at step 24, and the query's answer is returned at step 28. If the answer is 'yes', the number of rows affected by query is estimated at step 22, and the number of rows is compared with the number of rows in the original data at step 23 to determine if there is a speedup. If the answer to step 23 is 'no', the query is executed on the original data items at step 24, and the query's answer is returned at step 28. If the answer is 'yes', the SQL query translator is executed on the compressed data at step 25, the transformed query is executed at step 26, and the query result is translated back into an uncompressed form at step 27. At step 28, the query's answer is returned.

Figure 3:
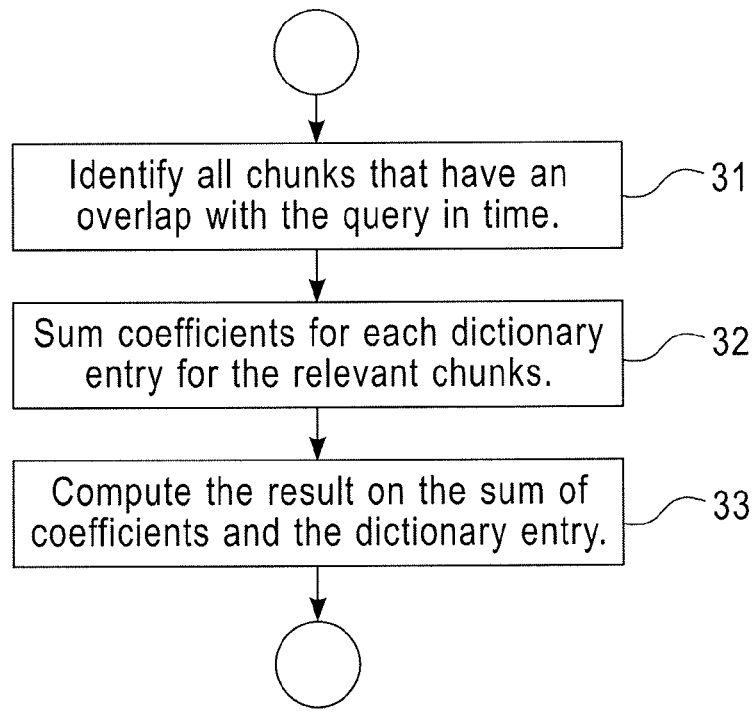
FIG. 3 is a flowchart of a method for answering an aggregation query, according to an embodiment of the invention.

By storing in compressed form additional time series derived from the original time series, other types of queries in step 26 of FIG. 2 can be answered. For example, an aggregation query based on the compressed representation includes three steps, with reference to the flowchart of FIG. 3:

1. Identify all chunks that have an overlap with the query in time (step 31).
2. Summing coefficients for each dictionary entry for the relevant chunks (step 32).
3. Computing the result on the sum of coefficients and the dictionary entry (step 33).

Step 31 includes rewriting the where condition on the time stamp so as to identify all chunks that cover at least one point in the selected time intervals. For most queries, this can be done easily. For more complex queries, the query can actually be executed on the data base to yield the time points to cover. These time points can then be re-mapped to a SQL query.

Step 32 can be expressed in the relational model as a SUM aggregation and a GROUP BY, using the dictionary entry or atomic index as a group column and a WHERE clause, that expresses the time intervals to cover. In the above example, this would be a SQL query such as the following for calculating the sum of coefficients for a given time interval that start at 10.10.2010.

SELECT ALPH_ID, SUM(ALPHA) FROM <SPARSE_TABLE> WHERE TS>'2010-10-10' GROUP BY ALPH_ID

Step 33 can be computed either through a join with the dictionary table or, if more appropriate, through a stored procedure or a client module.

Note that the aggregation queries described here are not applicable to minimum or maximum calculations.

According to embodiments of the invention, some queries can use additional time-series derived from the original time-series. These derived time-series will also be compressed based on a shape dictionary that may be the same as the one used for storing the original time-series may be different if judged advantageous. A typical example for such a query is variance. Variance requires knowledge of both the sum of the original values and the sum of the squared values of the targeted series. However, dictionary-based compression is not suited to calculate the sum of the squared values of the targeted time-series for the square operation is non linear and therefore can not be computed directly over the compressed representation.

Variance can be calculated in embodiments of the invention by using a derived time series that represents the squared values of the original time series. According to embodiments of the invention, an additional dictionary may be used to hold the squared version of the original signals as this enables a higher compression. Then the squared version of the time series can be compressed over this additional dictionary and stored in compressed form in the same way as the original series and the same techniques can be used to sum the squared values of the time-series from which the variance can be calculated.

Missing values can be automatically interpolated by the dictionary approach. If missing values should be explicitly considered, the original representation may be used or a dedicated table storing the emplacement of the original missing values may be used.

Correlation queries can be answered as follows. An efficient implementation for computing correlation breaks this operation into the equivalent computation of three sub-operations: mean, variance and dot-product. The above description of aggregation shows how an efficient calculation of mean and variance can be achieved directly on the compressed representation. An efficient calculation for the dot-product is as follows. Suppose there are two time series $TS_1=\{s_1, \ldots, s_J\}$ and $TS_2=\{u_1, \ldots, u_J\}$ from which to compute the Euclidean scalar product ($TS_1 \cdot TS_2$). The compressed time series are $S_j(t) \approx \Sigma_i^{sp} \alpha_{j,i} \phi_i(t)$ and $u_l(t) \approx \Sigma_i^{sp} \beta_{l,i} \phi_i(t)$, $(TS_1 \cdot TS_2) = \Sigma_{t \in T} TS_1(t) \cdot TS_2(t)$.

Then, $$(TS_1 \cdot TS_2) \approx \Sigma_j (\Sigma_i^{sp} \alpha_{j,i} \phi_i(t))(\Sigma_l^{sp} \beta_{j,l} \phi_l(t))$$

$$(TS_1 \cdot TS_2) \approx \Sigma_{0 \le i,l \le sp} \phi_i(t) \phi_l(t) \Sigma_j (\beta_{j,i} \alpha_{j,i}) \quad (4)$$

As can be seen, the query relating to all the points of each time-series can be transformed into a query on all the coefficients $\alpha$ and $\beta$ of the compressed representation of both time-series. The correlation between the two time series can then be directly calculated using the formula:

$$\mathrm{Corr}(TS_1, TS_2) = \frac{((TS_1 \cdot TS_2) - n \cdot \mathrm{mean}(TS_1) \cdot \mathrm{mean}(TS_2))}{\sqrt{\mathrm{var}(TS_1) \cdot \mathrm{var}(TS_2)}}, \quad (5)$$

where n is the number of points over which the correlation is calculated. This way similarity queries based on the dot product, covariance or correlation can be efficiently answered directly on the compressed representation of the data.

Not all queries benefit from being executed on the sparse representation. If, for example, only a single point per day is selected, e.g. computing the average of all values at 10:00 AM, it might be more efficient to actually execute the query on the original data representation rather than on the sparse one.

Embodiments of the invention can automatically decide for each query whether to use a sparse query execution or to use the original data representation. As both representations use the same primitive SQL commands, this decision depends on the number of rows affected in each table. As a heuristic, embodiments assume that all series, both the original and compressed representations, contain all the information available about the time series, and thus cover the same overall time interval. In this case, only the number of points in time, for the original representation, and the number of affected chunks, for the sparse representation, need be taken into account. As time spans in queries are usually rather small, these quantities can be calculated rather quickly. The speed-up by using the sparse representation over the original is then linear in the fraction of both. The linear factor can be determined empirically once for the database.

A higher, sparser compression level according to an embodiment allows for less accurate approximate results that are much faster to compute. Thus, a user can trade initial response time for accuracy. Dictionaries are especially well-suited for this operation, as they allow storing components of the signal in descending order of importance. This can be done because the influence of each component decreases exponentially, meaning reconstructing the signal using only the first atom will yield a reconstruction accuracy of 60%, while using the first two is 80%, the first three 90% etc. Depending on the accuracy targeted by the application, the user can state that the query should be answered using only the 3 first atoms to quickly obtain a first estimate of the query's result, while computing the result using the remaining atoms only in a slower second phase to obtain an exact result.

This can be achieved in the relational model by introducing a WHERE clause in the query that selects only atoms of a given rank, e.g. only the first two most important ones. Subsequently, the remainder of the atoms can be retrieved. This approach is especially well-suited, if the data base in partitioned so that a first database holds the most important atoms for each series, and a second database holds the remaining atoms. Then, the first database can be hosted in-memory to respond to queries extremely quickly with an approximate result, while the more accurate result is calculated from the second database in the background. As using the in-memory database is more expensive, this gives a good trade-off between cost and query response time.

Embodiments of the present disclosure have assumed that the data-bases are used for Online Analytical Processing (OLAP) and are thus bulk-loaded at regular intervals. However, similar methods could be used in a transactional setting. When bulk storing data into the database, it can be compressed on the fly, so to store two versions of it, one is compressed and one is a non-compressed version. Consistency, i.e. making sure that the series in both representations are in sync, can be achieved by using transactions, such that the compressed and the non-compressed version are written in an atomic way. The compression can be performed either in-database, through stored-procedures external to the database, or using custom client logic. Another possibility is to use triggers to ensure that both tables are in-sync.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
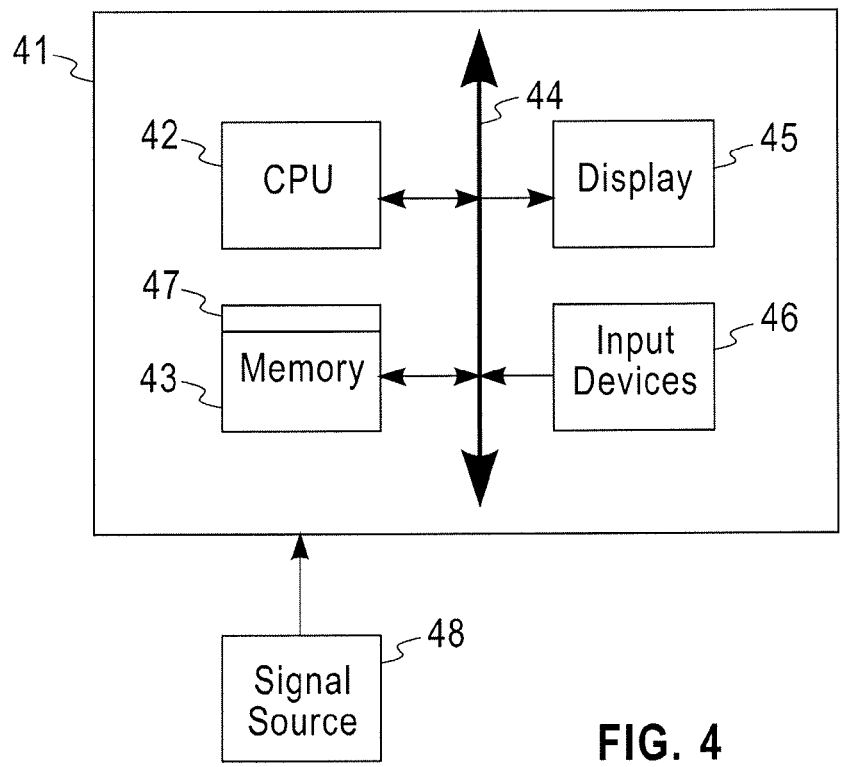
FIG. 4 is a block diagram of an exemplary computer system for implementing a method for a dual representation of time-series in relational data-bases and for automatically determining which representation to use for answering a given query.

FIG. 4 is a block diagram of an exemplary computer system for implementing a method for a dual representation of time-series in relational data-bases and for automatically determining which representation to use for answering a given query. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for accelerating time series data base queries comprising the steps of:

segmenting an original time series of signal values into non-overlapping chunks, where a time-scale for each of the chunks is much less than the time scale of the entire time series;

representing time series signal values in each chunk as a weighted superposition of atoms that are members of a shape dictionary, to create a compressed time series;

storing said original time series and said compressed time series into a database, determining whether a query is answerable using said compressed time series or said original time series, and whether answering said query using said compressed time series is faster; and if answering the query is faster using the compressed representation, executing the query on weight coefficients of the compressed time series to produce a query result, and translating the query result back into an uncompressed representation, wherein the original time series is $S=(s(t_1), \ldots, s(t_n))$ with n values, the shape dictionary is $D=\{\phi_i, i \in I\}$ with each atom $\phi_i=(\phi_i(t_1), \ldots, \phi_i(t_n))$ of the dictionary being a set of signal samples, and said weighted superposition of atoms is $$S(t) = \sum_{i=1}^{k} \alpha_i \varphi_i(t),$$

wherein the $\alpha_i$ are weight coefficients determined to fit the signal samples to the time series.

2. The method of claim 1, wherein determining whether answering said query using said compressed time series is faster comprises calculating a ratio of a number of affected chunks in the compressed time series over a number of affected signal values of the original time series, where a speedup of query execution is proportional to said ratio.

3. The method of claim 1, the method further comprising executing said translated query on a higher different compression level to obtain an approximate result more quickly.

4. The method of claim 3, wherein the higher different compression level is determined by the number of elements of the shape dictionary that are used in the compressed representation.

5. The method of claim 1, the method further comprising storing in compressed form additional time-series derived from said original time-series to speed up a specific query.

6. The method of claim 5, wherein a shape dictionary used to compress the derived time series is different from the shape dictionary used to compress the original time series.

7. The method of claim 5, the method further comprising representing squares of time series signal values in each chunk as a weighted superposition of atoms that are members of a squared shape dictionary, to create a compressed squared time series, wherein a variance of said original time series is calculated from said compressed time series and said compressed squared time series.

8. The method of claim 5, the method further comprising, for a query involving an inner product of two time series, summing a product of weight coefficients respectively associated with a compressed version of each time series.

9. The method of claim 1, wherein if said query is answerable using said compressed time series and answering said query using said compressed time series is faster, the method further comprises:
translating said query to use said compressed time series,
identifying all chunks in the compressed time series that have a time overlap with the query;
executing said translated query on said overlapping compressed time series chunks to obtain compressed query results,
aggregating said compressed query results, and
translating said aggregated query result back into an uncompressed representation by summing over elements of the shape dictionary.

10. A method for accelerating time series data base queries comprising the steps of:
segmenting an original time series of signal values into non-overlapping chunks, where a time-scale for each of the chunks is much less than the time scale of the entire time series;
representing time series signal values in each chunk as a weighted superposition of atoms that are members of a shape dictionary, to create a compressed time series;
storing said original time series and said compressed time series into a database,
storing in compressed form additional time-series derived from said original time-series to speed up a specific query;
representing squares of time series signal values in each chunk as a weighted superposition of atoms that are members of a squared shape dictionary, to create a compressed squared time series, wherein a variance of said original time series is calculated from said compressed time series and said compressed squared time series;
determining whether a query is answerable using said compressed time series or said original time series, and whether answering said query using said compressed time series is faster; and
if answering the query is faster using the compressed representation, executing the query on weight coefficients of the compressed time series to produce a query result, and translating the query result back into an uncompressed representation.

11. The method of claim 10, wherein determining whether answering said query using said compressed time series is faster comprises calculating a ratio of a number of affected chunks in the compressed time series over a number of affected signal values of the original time series, where a speedup of query execution is proportional to said ratio.

12. The method of claim 10, the method further comprising executing said translated query on a higher different compression level to obtain an approximate result more quickly.

13. The method of claim 10, wherein the higher different compression level is determined by the number of elements of the shape dictionary that are used in the compressed representation.

14. The method of claim 10, wherein a shape dictionary used to compress the derived time series is different from the shape dictionary used to compress the original time series.

15. The method of claim 10, the method further comprising, for a query involving an inner product of two time series, summing a product of weight coefficients respectively associated with a compressed version of each time series.

16. The method of claim 10, wherein the original time series is $S=(s(t_1), \ldots, s(t_n))$ with n values, the shape dictionary is $D=\{\phi_i, i \in I\}$ with each atom $\phi_i=(\phi_i(t_1), \ldots, \phi_i(t_n))$ of the dictionary being a set of signal samples, and said weighted superposition of atoms is $$S(t) = \sum_{i=1}^{k} \alpha_i \varphi_i(t),$$

wherein the $\alpha_i$ are weight coefficients determined to fit the signal samples to the time series.

17. The method of claim 10, wherein if said query is answerable using said compressed time series and answering said query using said compressed time series is faster, the method further comprises:
translating said query to use said compressed time series,
identifying all chunks in the compressed time series that have a time overlap with the query;
executing said translated query on said overlapping compressed time series chunks to obtain compressed query results,
aggregating said compressed query results, and
translating said aggregated query result back into an uncompressed representation by summing over elements of the shape dictionary.

* * * * *